(12) United States Patent
Wiese et al.

(10) Patent No.: US 10,545,069 B1
(45) Date of Patent: Jan. 28, 2020

(54) CASCADE WIND TUNNEL TURBULENCE GRID

(71) Applicant: Government of the United States, as represented by the Secretary of the Air Force, Wright-Patterson AFB, OH (US)

(72) Inventors: Connor Wiese, Adrian, MI (US); Kurt Rouser, Monument, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 385 days.

(21) Appl. No.: 15/009,210

(22) Filed: Jan. 28, 2016

Related U.S. Application Data

(60) Provisional application No. 62/144,093, filed on Apr. 7, 2015.

(51) Int. Cl.
  *G01M 9/04* (2006.01)
  *F15D 1/00* (2006.01)
  *B01F 5/00* (2006.01)

(52) U.S. Cl.
  CPC .............. *G01M 9/04* (2013.01); *F15D 1/00* (2013.01); *F15D 1/0005* (2013.01); *B01F 2005/0025* (2013.01); *B01F 2215/0037* (2013.01)

(58) Field of Classification Search
  CPC .......... G01M 9/04; F15D 1/0005; F15D 1/00; B01F 2005/0025; B01F 2215/0037
  (Continued)

(56) References Cited

U.S. PATENT DOCUMENTS

| 2,815,532 A | * | 12/1957 | Braunlich | ............. | B01F 5/0609 |
| | | | | | 137/896 |
| 3,835,886 A | * | 9/1974 | Zajac | ................... | F02M 21/045 |
| | | | | | 137/896 |

(Continued)

FOREIGN PATENT DOCUMENTS

WO    WO 2012/034106    3/2012

OTHER PUBLICATIONS

D. Hurst et al., Turbulence Generated by Fractal Grids, Department of Aeronautics and Institute for Mathimatical Sciences Imperial College London, UK.

(Continued)

*Primary Examiner* — Tony G Soohoo
(74) *Attorney, Agent, or Firm* — AFMCLO/JAZ; Jeff Moore

(57) ABSTRACT

A cascade wind tunnel T-bar turbulence generating grid for creating a turbulence intensity in an air flow having an air flow volume for testing at least two turbine blades having a turbine blade dimension and a pitchwise location, the turbulence generating grid comprising a plurality of cross bars having a front surface and a cross bar gap, a plurality of vertical bars having a vertical bar front surface and a cross bar gap and at least two support bars assembled to form a plurality of air flow. The support bar at an angle θ to the air flow and about parallel to the turbine blades. The cross bars mounted to the support bar such that the cross bar front surface is perpendicular to the air flow. The vertical bars are mounted to the support bar such that the vertical bar front surface is perpendicular to the air flow and wherein the vertical bar gap and a horizontal gap provide the turbulence intensity about constant across the pitchwise location.

1 Claim, 6 Drawing Sheets

(58) Field of Classification Search
USPC .................................................. 366/336–337
See application file for complete search history.

(56) References Cited

U.S. PATENT DOCUMENTS

| | | | | |
|---|---|---|---|---|
| 4,018,427 | A | * | 4/1977 | Marulli .................... B29C 45/14 204/213 |
| 5,303,882 | A | * | 4/1994 | Bandyopadhyay ..... B64C 23/06 138/37 |
| 5,938,333 | A | | 8/1999 | Kearney |
| 6,997,049 | B2 | * | 2/2006 | Lacey, Jr. ................. G01M 9/04 257/E29.272 |
| 7,302,840 | B2 | * | 12/2007 | Hanff ....................... G01M 9/02 73/148 |
| 7,922,981 | B2 | * | 4/2011 | Hauptmann ............. B01J 14/00 210/511 |
| 9,010,994 | B2 | * | 4/2015 | McQueen ............. B01F 5/0618 366/337 |
| 10,086,298 | B2 | * | 10/2018 | Romanenko ............ G01M 9/04 |
| 2010/0226202 | A1 | | 9/2010 | Vassilicos et al. |
| 2011/0080802 | A1 | | 4/2011 | Vassilicos et al. |
| 2012/0205068 | A1 | * | 8/2012 | Martindale ............. G01M 9/04 165/67 |
| 2013/0284830 | A1 | | 10/2013 | Wells et al. |

OTHER PUBLICATIONS

Sylvain Laizet et al., DNS of Fractal-Generated Turbulence, Flow Turbulence Combust (2011) 87:673-705.

P.C. Valente et al., The Decay of Turbulance Generated by a class of Multi-scale Grids, Dept of Aeronautics, Imperial College London, SW7 2AZ UK, Aug. 21, 2011.

Terrence W. Simon et al, Separating and Separated Boundary Layers, WPAFB Laboratory Fianal Report, Feb. 1996.

P.E. Roach, The Generation of Nearly Isotropic Turbulence by Means of Grids, Heat and Fluid Flow, vol. 8, No. 2, Jun. 1987.

Kenneth W. Van Treuren et al., Measurements in a Turbine Cascade Under Ultra Low Renolds Number Conditions, Transactions at the ASME, vol. 124, Jan. 2002.

Terrence W. Simon et al., Flow Field Turbulance Measurements, USAFA Aeronautics Laboratory, Summer 1999.

James W. Baugh et al., An Experimental Investigation of Heat Transfer and Separation on Turbine Blades at Low Renolds Number and High Turbulence Intensity, 1995.

Connor J. Wiese et al., Passive Turbulence Generating Grid Arrangements in a Turbine Cascade Wind Tunnel, Apr. 15, 2014 AIAA Region V Student Paper Conference.

Donald M. McEligot, Uniform Inlet Conditions for the NPS Subsonic Cascade Wind Tunnel, Naval Post Graduate School, Dec. 1981.

\* cited by examiner

Re=100 K Inlet Profiles for a typical parallel mesh grid (left) and a T-bar grid (Right) at x/d = 104

CASCADE WIND TUNNEL TURBULENCE GRID

Pursuant to 37 C.F.R. § 1.78(a)(4), this application claims the benefit of and priority to prior filed Provisional Application Ser. No. 62/144,093 filed May 4, 2015, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to improving the desired characteristics and/or direction of generated turbulence in a cascade wind tunnel for the testing of turbine blades.

BACKGROUND OF THE INVENTION

Turbine cascade wind tunnels simulate Reynolds number and turbulence for the examination of flow phenomena such as boundary layer separation on the trailing portion of low pressure turbine blades. Separation may occur for axial chord-based Reynolds numbers of about 50 k to about 100 k Axial chord-based Reynolds numbers may be from about 50 k to about 100 k. Various passive, square-bar turbulence generating grid arrangements may be explored to simulate turbulence in a turbine cascade test-section inlet, including two grid orientations: perpendicular to the air inlet flow and parallel to the turbine cascade. A novel T-bar grid configuration oriented parallel to a turbine blade cascade was shown to produce improved test section inlet flow field uniformity than that produced by a perpendicular mesh grid. Improved periodicity in blade-to-blade surface pressure coefficient profiles may also observed with the parallel T-Bar grid.

Turbine cascade wind Tunnels are similar to conventional wind tunnels except the test section of interest is in a corner. FIG. 5 shows an illustration of a closed-loop cascade wind tunnel. Cascade wind tunnel facilities are used to simulate turbine operating conditions for the study of flow phenomena such as boundary layer separation over the trailing portion of a turbine suction surface. In addition to Reynolds number, turbulence is preferably simulated as well because turbine performance is sensitive to both. Turbines are susceptible to adverse flow effects at low Reynolds numbers and low turbulence intensities.

It is possible to evaluate various turbulence generating grid configurations in a cascade wind tunnel.

Different designs for turbulence generating grids have been proposed for many years, including U.S. application Ser. No. 12/897,105; and U.S. application Ser. No. 12/296,004. Further complicating the generation of turbulent flow is having it applied uniformly across a turbine blades in a cascade wind tunnel. Conventional turbulence generating grids designs have two limitations. First, they are not designed or optimized for the corner test section of a curved cascade wind tunnel where the turbine blades, unlike many other structures are at an angle to the air flow. When the grid assembly inserted perpendicular to the air flow, the turbulence exits the turbulence generating grids perpendicular to the turbulence generating grids and air flow, not the turbine blades being modeled. A cursory review to air flow turbulence generation may conclude that the standard grid, placed in the air flow at the same angle as the turbine blades, would obviously solve this problem. It does not. The prior art turbulence generating grids angled to the flow redirect the flow so that the angle of attack experienced by the turbines is changed from their original design, making measurements even less useful than with a perpendicular turbulence generating grid in many cases. The present invention is an advancement which reduces this deficiency in the prior art with an improved T-bar grid design for cascade wind tunnels, reducing the undesirable changes in air flow. The T-bar grid design allows the overall assembly to be angled to the flow while individual turbulence grid elements are perpendicular to the flow.

SUMMARY OF THE INVENTION

The present invention overcomes the foregoing problems and other shortcomings, drawbacks, and challenges of turbulence generating grids. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention includes a cascade wind tunnel T-bar turbulence generating grid for creating a turbulence intensity in an air flow having an air flow volume for testing at least two turbine blades having a turbine blade dimension and a pitchwise location, the turbulence generating grid comprising a plurality of cross bars having a front surface and a cross bar gap, a plurality of vertical bars having a vertical bar front surface and a cross bar gap and at least two support bars assembled to form a plurality of air flow holes. The support bar at an angle $\theta$ to the air flow and about parallel to the turbine blades. The cross bars mounted to the support bar such that the cross bar front surface is in one embodiment perpendicular to the air flow. The vertical bars is in one embodiment mounted to the support bar such that the vertical bar front surface is in one embodiment perpendicular to the air flow and wherein the vertical bar gap and a horizontal gap provide the turbulence intensity about constant across the pitchwise location. The turbulence generating grid plurality of vertical bars may be proportional to the number of turbine blades. The turbulence generating grid plurality of vertical bars may have a size dimension proportional to their distance from the turbine blades. The turbulence generating grid plurality of vertical bars may have a size dimension proportional to the turbine blade cord. The turbulence generating grid plurality of cross bars may have a size dimension proportional to the turbine blade cord. The turbulence generating grid plurality of cross bars may be square and about 0.5 inches on a side. The turbulence generating grid plurality of vertical bars may be square and about 0.5 inches on a side. The turbulence generating grid plurality of vertical bars may be about one inch apart. The turbulence generating grid cross bar horizontal space may be about one inch. The turbulence generating grid plurality of cross bars may have a dimension size proportional to the turbine blade dimensions. The turbulence generating grid plurality of cross bars is in one embodiment proportional to the number of turbine blades. The turbulence generating grid plurality of cross bars may be proportional to the number of turbine blades. The turbulence generating grid cross bar gap may be less than about 0.04 inches. The turbulence generating grid wherein the cross bar gap is about 0.0 inches. The turbulence generating grid cross bar gap may be less than or about 0.004 inches. The turbulence generating grid cross bar gap may be less than or about 0.2 inches.

A cascade wind tunnel T-bar turbulence generating grid including a plurality of cross bars having a front surface and a cross bar gap. A plurality of vertical bars having a vertical bar front surface and a cross bar gap and at least two support bars assembled to form a plurality of air flow holes. The support bar at an angle θ to a cascade wind tunnel air flow and about parallel to a turbine blade cascade with a pitchwise location. The cross bars mounted to the support bar such that the cross bar front surface is in one embodiment perpendicular to the cascade wind tunnel air flow. The vertical bars is in one embodiment mounted to the support bar such that the vertical bar front surface is in one embodiment perpendicular to the cascade wind tunnel air flow and wherein the vertical bar gap and a horizontal gap combine to provide a turbulence intensity about constant across the turbine blade cascade pitchwise location. Turbulence intensity is defined as the standard deviation of velocity divided by average velocity for a given sample size from a certain duration of sample time. In one embodiment the turbulence generating grid wherein the cross bar gap may be less than about 0.04 inches. The turbulence generating grid cross bar gap may be less than 0.004 inches.

One object of the present invention is to provide a more uniform turbulence intensity to the turbine blades and preferably also a more uniform velocity profile to the turbine blades. A further objective may be to provide more uniform inlet profiles to the turbine blades. Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
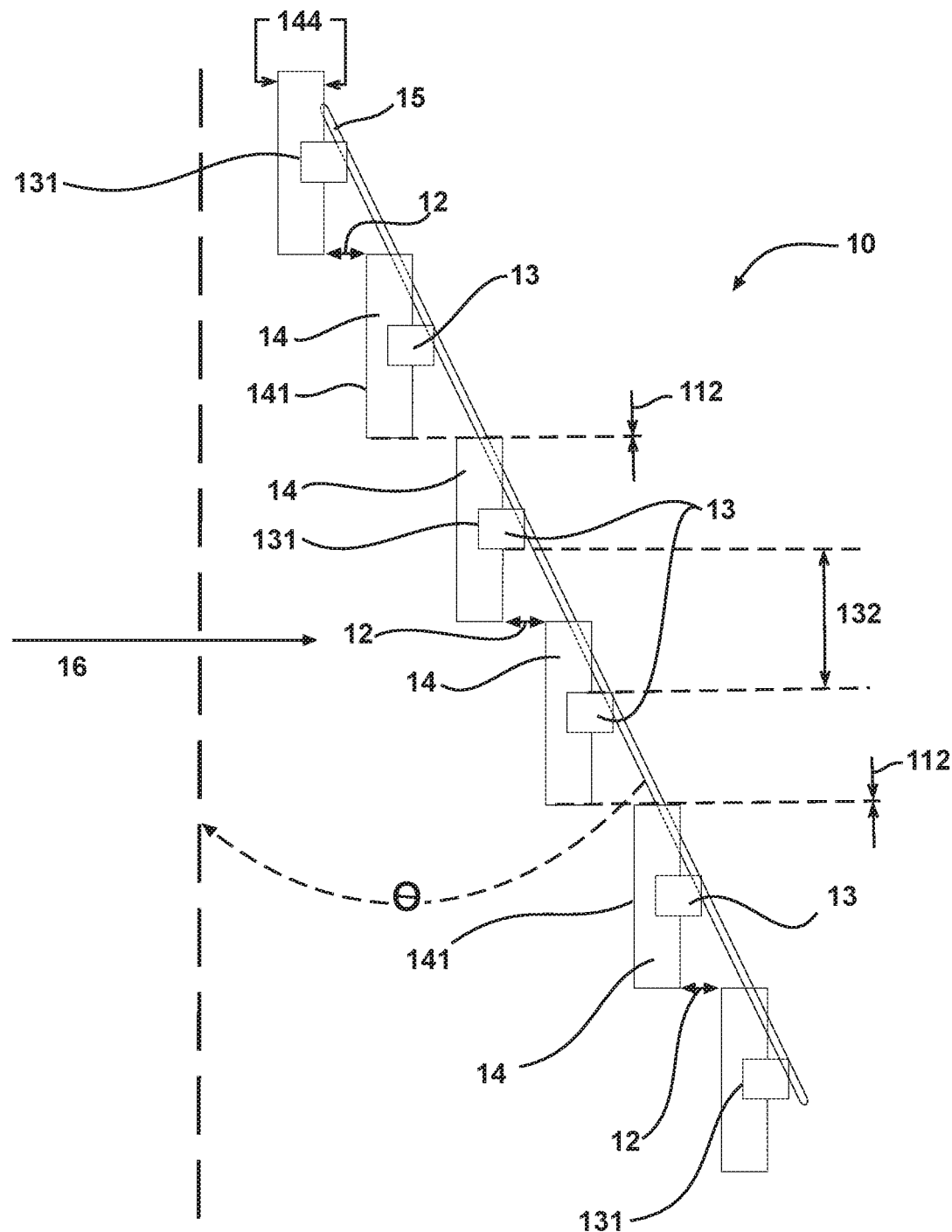
FIG. 1 is an illustration of one T-bar grid embodiment viewed from the top down.

Each figure sharing similar elements from different views share the same reference number for clarity. FIG. 1 is a not to scale top view illustration of a cascade wind tunnel turbulence generating T-bar grid 10 for creating turbulence in an air flow 16, having an air flow volume for testing a cascade of turbine blades (not shown, See FIG. 4). The T-bar grid 10 comprising a plurality of cross bars 14 having a cross bar diameter 144 (mathematically represented as d) a cross bar front surface 141 facing the air flow 16, a cross bar horizontal space 142 (not shown, See FIG. 2), and a step back gap 12 (illustratively exaggerated—not to scale) a plurality of vertical bars 13 having a vertical bar front surface 131 facing the air flow 16, and a vertical bar space 132 between adjacent vertical bars and at least two support bars 15 assembled to form a plurality of air flow apertures (not shown, see FIG. 2) between the adjacent cross bars and adjacent vertical bars. The support bar 15 holds the plurality of vertical bars at an angle θ to the air flow 16 and about parallel to the turbine blade cassette 17 (not shown, See FIG. 4). The cross bars 14 are in one embodiment mounted to the vertical bars 13 such that the cross bar front surface 141 is in one embodiment perpendicular to the air flow 16 and wherein adjacent cross bars have a cross bar step back gap 12 and a cross bar spacing gap 112 measured perpendicularly between adjacent cross bars.

The step back gap 12 represents the distance between cross bars 14 parallel to the air flow 16 as they are "stepped back" in the turbulence generating grid 10. In one embodiment there is no step back gap 12. Alternatively, the step back gap may be between about 0 and about 0.2 inches, alternatively it may be less than about 0.08 inches. The step back gap 12 may be about 1 inch or between about 1.0 and 1.5 inches. The step back gap 12 may be about 1.38 inches.

The cross bar spacing gap 112 is the distance between adjacent cross bars 14, perpendicular to the air flow 16. The cross bar spacing gap 112 may be zero. The adjacent cross bars alternatively overlap in the cross bar spacing gap measured direction. The cross bar spacing gap 112 may be between about 0 inches and about 0.2 inches, alternatively it may be less than about 0.08 inches or less than about 0.04 inches. The vertical bars 13 mounted to the support bar 15 such that the vertical bar front surface 131 is in one embodiment preferably perpendicular to the air flow 16 and wherein the vertical bar space 132 and a cross bar horizontal space 142 form an air turbulence aperture 11 (not shown, See FIG. 2). In one embodiment the air flow shown in FIG. 1 could be reversed depending upon the cascade wind tunnel and turbine blade orientation.

In one embodiment the vertical bar front surface and cross bar front surface may be on the opposite side of T-bar grid 10 were the air flow in FIG. 1 coming from the opposite direction. In one embodiment the cross bars and horizontal bars are about 0.5 inches wide on each side and about 2 inches long. In alternative embodiments the vertical bar may be placed either behind the cross bar relative to the airflow 16 or in front of the cross bar relative to the airflow 16. The cross bar may be attached to the vertical bar by any means known in the art. The cross bar may be at least partially imbedded into the vertical bar as shown in FIG. 1 and FIG. 3.

Figure 2:
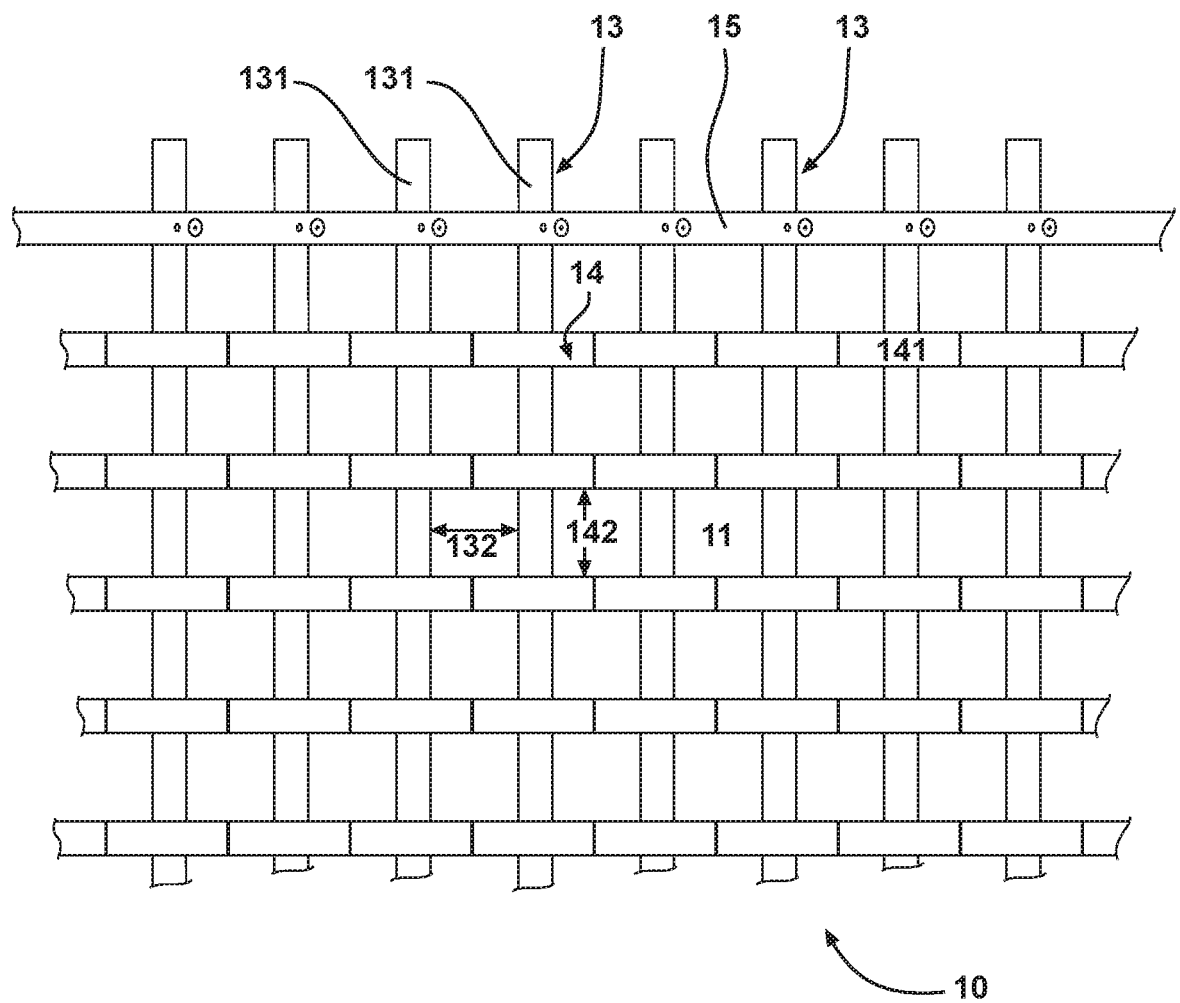
FIG. 2 is an illustration of one T-bar grid embodiment viewed from the direction of incoming air flow.

FIG. 2 is a not to scale illustration of a cascade wind tunnel turbulence generating T-bar grid 10 for creating turbulence in an air flow as viewed looking parallel to the air flow 16 into or out of the paper. The T-bar grid 10 comprising a plurality of cross bars 14 having a cross bar front surface 141 facing the air flow 16, a cross bar horizontal space 142, and a step back gap (not shown in this view) a plurality of vertical bars 13 having a vertical bar front surface 131 facing the air flow, and a vertical bar space 132 and at least one support bar 15, in one embodiment at least two support bars 15 assembled to form a plurality of air flow apertures 11 between the adjacent cross bars 14 and adjacent vertical bars 13. The cross bars 14 mounted to the vertical bar 13 such that the cross bar front surface 141 is in one embodiment perpendicular to the air flow 16 and the vertical bars 13 mounted to the support bar 15 such that the vertical bar front surface 131 is in one embodiment perpendicular to the air flow 16 and wherein the vertical bar space 132 and a cross bar horizontal space 142 form an air turbulence aperture 11 proportional to the air flow volume. In one embodiment the vertical bar front surface 131 and cross bar front surface 141 may be on the opposite side of T-bar grid 10 were the air flow in FIG. 2 (not shown) coming out of the paper view. In one embodiment the horizontal space 142 may be between about one inch and two inches, between 1.5 inches and 2 inches or about 1.875 inches. In one embodiment the vertical bar space 132 may be between about one inch and two inches, between 1.5 inches and 2 inches or about 1.875 inches. In one embodiment the air flow apertures 11 may be about 4 square inches, between 2.25 square inches and 4 square inches or about 3.5 inches.

Figure 3:
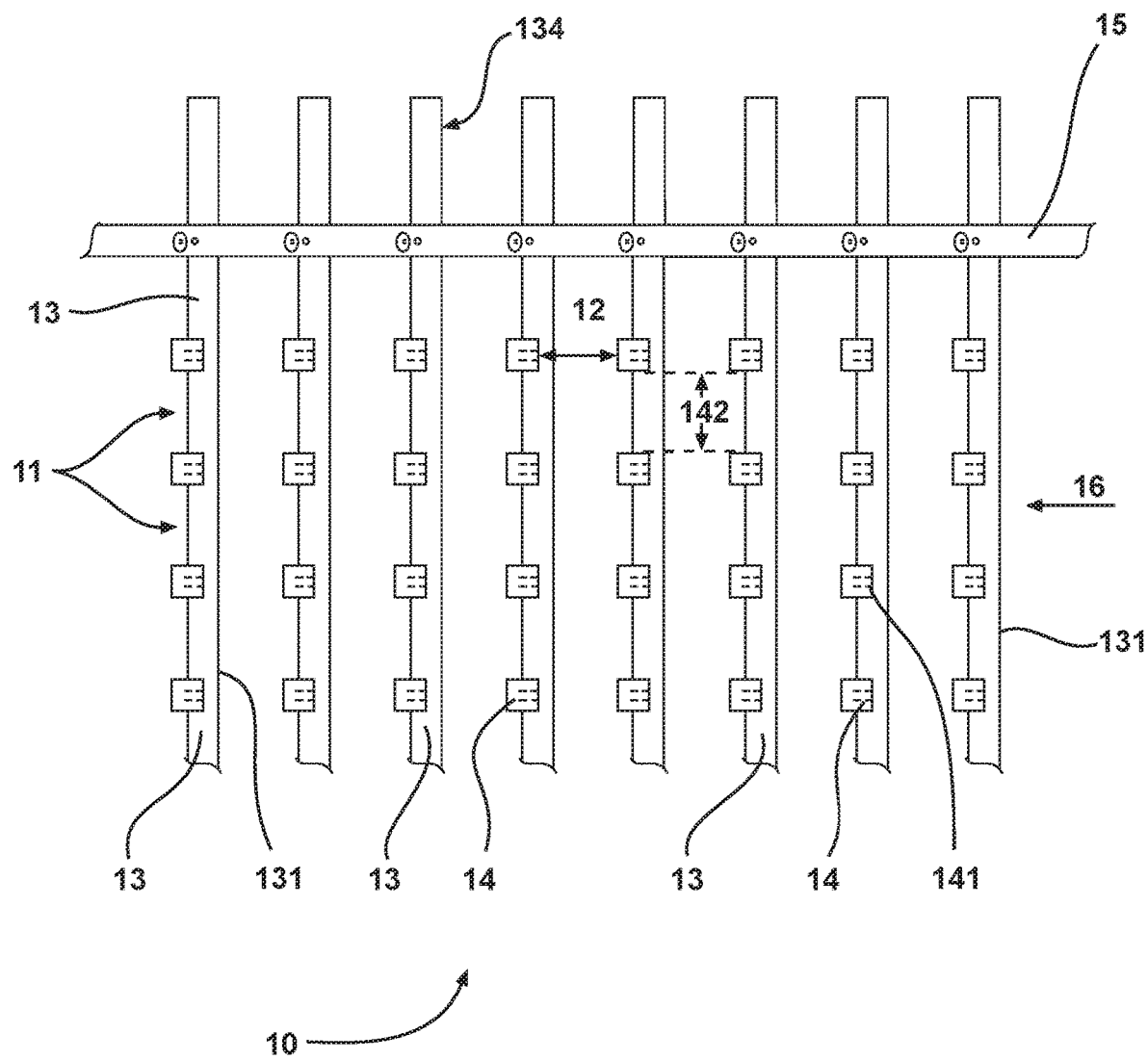
FIG. 3 is an illustration of one T-bar grid embodiment viewed from a direction perpendicular to the incoming air flow.
Figure 4:
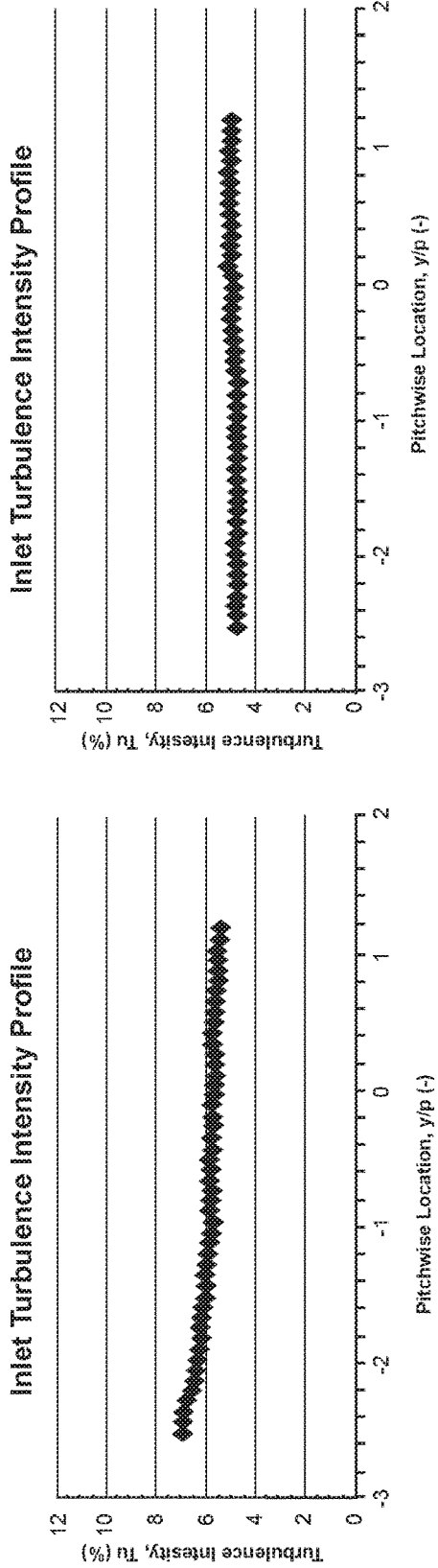
FIG. 4 is an illustration of T-bar grid performance improvement potential.
Figure 4:
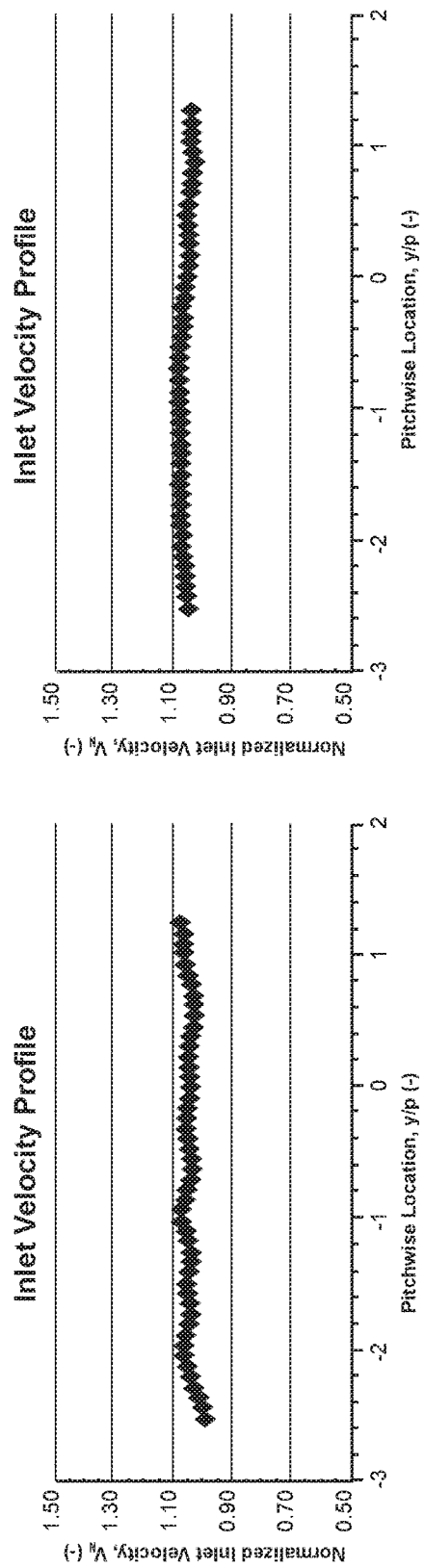

FIG. 3 is a not to scale side view perpendicular to air flow 16 of a cascade wind tunnel turbulence generating T-bar grid 10 for creating turbulence in an air flow 16, having an air flow volume for testing a cascade of turbine blades (not shown, See FIG. 4). The T-bar grid 10 comprising a plurality of cross bars 14 having a cross bar front surface 141 facing the air flow 16, a cross bar horizontal space 142, and a step back gap 12, a plurality of vertical bars 13 having a vertical bar diameter 134 (mathematically represented as d), a vertical bar front surface 131 facing the air flow 16, and a cross bar horizontal gap (not shown) and at least two support bars 15 assembled to form a plurality of air flow apertures 11 (side view) between the adjacent cross bars 14 and adjacent vertical bars 13. The support bar 15 at an angle θ (not shown) to the air flow 16 and about parallel to the turbine blades (not shown, See FIG. 4). The cross bars 14 mounted to the vertical bars 13 such that the cross bar front surface 141 is in one embodiment perpendicular to the air flow 16. The vertical bars 13 mounted to the support bar 15 such that the vertical bar front surface 131 is in one embodiment perpendicular to the air flow 16 and wherein the vertical bar space 132 and a cross bar horizontal space 142 form an air turbulence aperture 11 (side view). The cross bars may be embedded into the cross bars as shown.

Figure 5:
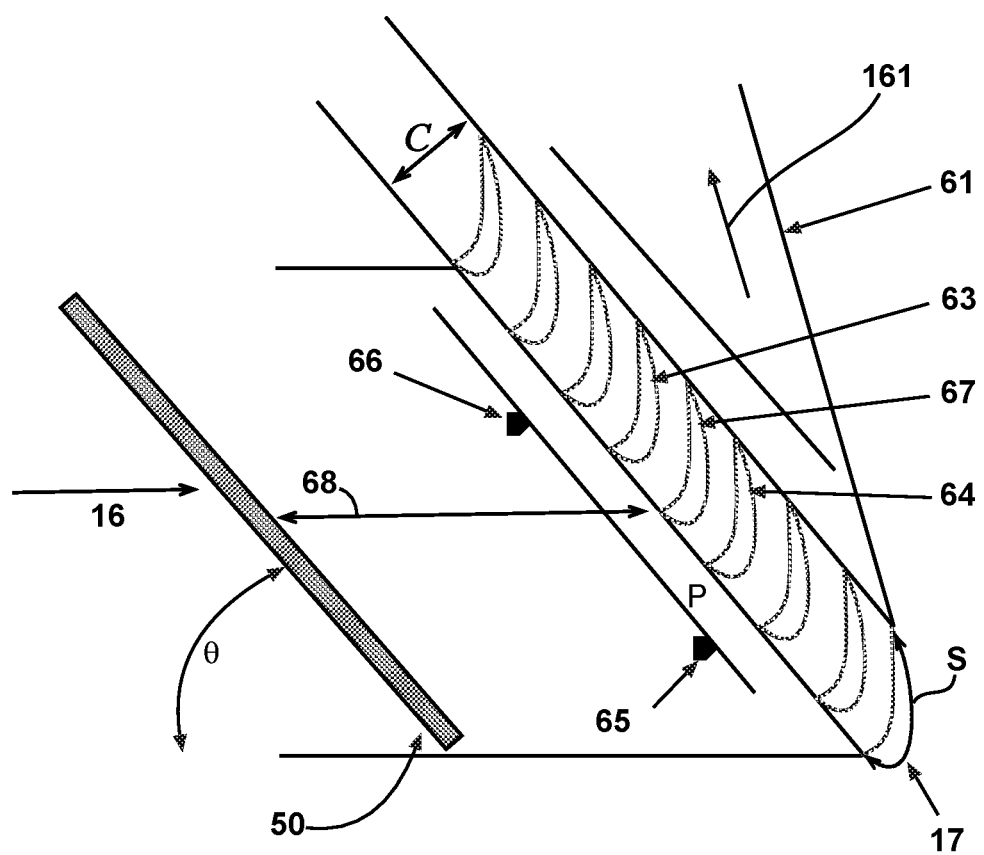
FIG. 5 is an illustration of one T-bar grid as oriented to a turbine blade cascade.

FIG. 4 is a graphical representation of a prior art parallel mesh grid (left) deployed in a cascade wind tunnel at about the same angle θ as the present invention (right) and the x/d, (the distance of each grid from the turbine blades divided by the grid element diameter) held constant. FIG. 5 is an illustration of x as 68, FIG. 1 is an illustration of d as element 144. The graphs show improved grid performance over the prior art even when placed in about the same orientation as the present invention to the turbine blades. Illustratively the T-bar grid cross bar and vertical bar element diameter d is in one embodiment about 0.5 in. and the parallel mesh grid diameter is in one embodiment about 1.875 inches.

FIG. 5 is an illustration of a grid 50 in relation to the turbine blade cassette 17 where the T-bar grid 50 is in one embodiment about parallel to the turbine blade cassette 17 and a distanced from the turbine blade cassette 17. Both the T-bar grid 50 and the turbine blade cassette 17 are at an angle θ to the air flow. The turbine blade cassette 17 may have a center blade 67, a south blade 64, a north blade 63 and a tailboard 61. As shown in FIG. 5, x (68) is measured from the center blade closest point (leading edge) to the grid being tested 50. The turbine true cord C length was about 19.05 cm with a suction surface S length of 28.25 cm.

FIG. 5 shows the turbine blade cassette 17 installed a cascade wind tunnel (not shown), spaced equally pitchwise to approximate the arrangement in an actual turbine. The Pitchwise location P is defined as the distance and region P between the leading edge (tip) of adjacent turbine blades and extends along the plurality of turbine blades, further forming an angle to the incoming air flow 16 of about equal to angle θ as shown in FIG. 5. The center blade 67 is the test article, with surface measurements being taken on each adjacent blade, the north blade 63 and the south blade 64. A variable tail board 61 is located downstream of the cassette, and can be adjusted to change the exit cross-sectional area and exit air flow 161. Adjustment of the variable tail board affects the flow upstream of the cassette and thus affects periodicity. The cascade wind tunnel preferably can utilize both perpendicular and parallel oriented grids. Grid distance from the test section is measured in terms of x/d. In FIG. 5, the distance between the turbine blade cassette 17 and the grid 50 is illustrated by 68, measured from the turbine blade to the grid, parallel with the cascade wind tunnel generated air flow 16.

The north blade 63 and south blade 64 adjacent to the center blade 67 each may contain numerous surface pressure taps, allowing pressure coefficients to be determined along the blade suction and pressure surfaces. Pressure taps may be instrumented with 20" of H2O and 10" of H2O pressure transducers connected to PSI 8400, which transfers data to a data acquisition computer. The fixed inlet probe 65 may contain three co-located measurement devices: a thermocouple, a pitot-static probe, and a Kiel probe, while the traversing probe may contain a Kiel probe and a hotwire anemometer. The traveling probe 66 is in one embodiment differenced against the static pressure collected by the fixed inlet probe 65. The entire probe suite may be instrumented with three, 1-torr Baratron pressure transducers. Additionally, the ambient temperature and pressure readings may be collected using a Heise barometer and thermometer.

For a pressure coefficient test, the first step is to properly orient and secure the desired turbulence generating grid. The turbulence generating grids are a perpendicular mesh grid as is typically used and an embodiment of the present invention, a parallel T-bar grid. The T-bar grid may be constructed using discrete, non-overlapping horizontal elements, mounted on a parallel array of square bars; so that the grid area projected on the flow field is equal to the perpendicular mesh grid. The fan speed may be adjusted so that the corresponding velocity yielded the desired Reynolds number. Once the desired temperature and Reynolds numbers were achieved, data may be collected using the PSI 8400 system.

The air velocity may be measured using a hotwire calibrated in-situ. Every run may include a hot wire calibration which consisted of increasing the ReCx in increments of 10,000, starting at 15,000 and going to 125,000. These data files were then graphed and fitted with a 4th order polynomial curve.

Figure 6:
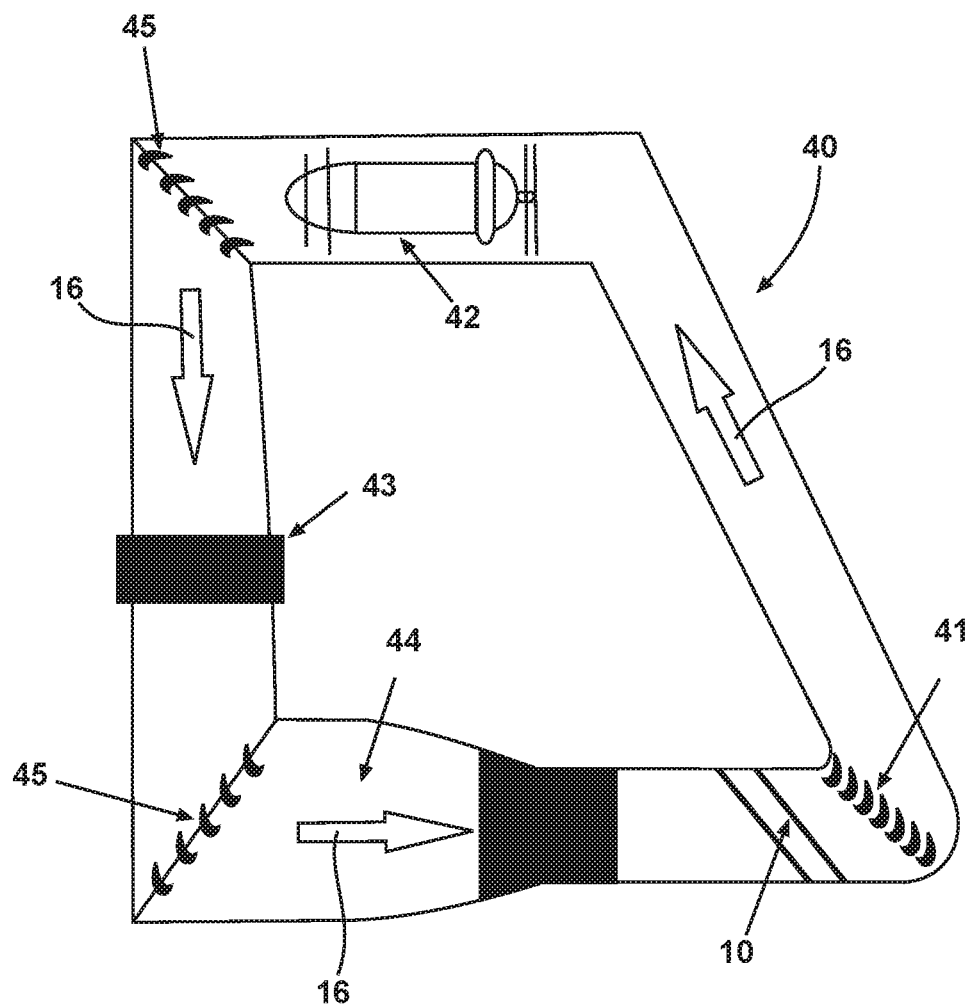
FIG. 6 is an illustration of the present invention in a cascade wind tunnel for testing turbine blades.

FIG. 6 is an illustration of a cascade wind tunnel 40 showing the T-bar grid 10 in relation to the turbine blade cascade 41, the air flow 16, a variable frequency fane 42 a heat exchanger 43, a plurality of turning vanes 45 and a stilling chamber 44. TunnelVision may be used for traverse control and LabView for data collection. Velocity, pressure and temperature data were collected at 1200 Hz for 40.96 seconds at each pitchwise location.

The examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

The T-bar grid turbulence intensity profile remains about constant across the inlet due to the constant x/d (distance 68/diameter 144 in FIG. 1) relative to the cascade and produces a more uniform inlet turbulence.

The T-bar grid exhibited improved uniform turbulence intensity and velocity profiles than the parallel mesh grid. When compared to the parallel mesh grid, the T-bar grid produces more favorable inlet profiles. Additionally, at no time was the tunnel velocity expected to exceed 15 m/s, correlating to a ~M=0.0132, well within the incompressible flow regime.

The cross bar step back gap 12 is in one embodiment between about 0.04 inches and about 0.2 inches or alternatively less than 0.08 inches or alternatively less than 0.04 inches. The cross bars may be imbedded into the vertical bars about 50% or alternatively at least about 25%.

The T-bar grid produces a more uniform inlet than the parallel mesh grid at similar test conditions. Additionally, the T-bar grid surface pressure coefficients match clean tunnel data better than the parallel mesh grid. A substantial improvement for turbine blade wind tunnel modelling.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A cascade wind tunnel T-bar turbulence generating grid comprising:
   a. a plurality of cross bars having
      a front surface and
      a cross bar space,
      a plurality of vertical bars having
      a vertical bar front surface and
      a vertical bar space, and
      at least two support bars assembled to form a plurality of air flow holes;
   b. the support bars having a mounting means configured for mounting the support bars at an angle θ to a cascade wind tunnel air flow and parallel to a turbine blade cascade with a pitchwise location;
   c. the cross bars mounted to the vertical bars and
      having a cross bar step back gap between each cross bar along the direction of the cascade wind tunnel air flow, and
      such that the plurality of cross bar front surfaces are is perpendicular to the cascade wind tunnel air flow;
   d. the vertical bars are mounted to the support bars such that the plurality of vertical bar front surfaces are perpendicular to the cascade wind tunnel air flow and
   wherein the plurality of air flow holes provide a turbulence intensity about constant across the turbine blade cascade.

* * * * *